US009648257B2

(12) United States Patent
Bosset et al.

(10) Patent No.: US 9,648,257 B2
(45) Date of Patent: May 9, 2017

(54) EFFICIENT METHOD FOR READING AN IMAGING DEVICE USING CORRELATED DOUBLE SAMPLING

(71) Applicant: TRIXELL, Moirans (FR)

(72) Inventors: Bruno Bosset, Moirans (FR); Laurent Charrier, Moirans (FR)

(73) Assignee: TRIXELL, Moirans (FR)

( * ) Notice: Subject to any disclaimer, the term of this patent is extended or adjusted under 35 U.S.C. 154(b) by 0 days.

(21) Appl. No.: 14/653,785

(22) PCT Filed: Dec. 20, 2013

(86) PCT No.: PCT/EP2013/077861
§ 371 (c)(1),
(2) Date: Jun. 18, 2015

(87) PCT Pub. No.: WO2014/096433
PCT Pub. Date: Jun. 26, 2014

(65) Prior Publication Data
US 2015/0350581 A1 Dec. 3, 2015

(30) Foreign Application Priority Data
Dec. 21, 2012 (FR) ..................... 12 62662

(51) Int. Cl.
H04N 5/341 (2011.01)
H04N 5/378 (2011.01)
H04N 5/374 (2011.01)
H04N 5/353 (2011.01)

(52) U.S. Cl.
CPC ........... *H04N 5/341* (2013.01); *H04N 5/3532* (2013.01); *H04N 5/374* (2013.01); *H04N 5/378* (2013.01)

(58) Field of Classification Search
None
See application file for complete search history.

(56) References Cited

U.S. PATENT DOCUMENTS 5,898,168 A 4/1999 Gowda et al.
6,433,632 B1 * 8/2002 Nakamura ........... G11C 27/026
                                                  327/124
7,456,879 B2 * 11/2008 Lim .................. H04N 1/40056
                                                  257/214

(Continued)

FOREIGN PATENT DOCUMENTS

EP 1 578 118 A2 9/2005

*Primary Examiner* — Shahbaz Nazrul
(74) *Attorney, Agent, or Firm* — Baker & Hostetler LLP

(57) ABSTRACT

A method for reading an imaging device intended for capturing images in a detector including a large number of photosensitive points called pixels organized into a matrix. The pixels of the same column are linked to a column conductor enabling the successive reading of the photosignals acquired by the pixels of the column, the method consisting for each of the pixels in carrying out a correlated double sampling read phase, the read phase comprising an operation of resetting the pixel followed by two read operations, the first without the photosignal, and the second with the photosignal. Three steps are concatenated in succession for the pixels of the same column:

1. a first of the operations of reading the pixel of a first row,
2. one of the operations of reading a second row,
3. a second of the operations of reading the pixel of the first row.

14 Claims, 6 Drawing Sheets

(56) References Cited

U.S. PATENT DOCUMENTS

| | | |
|---|---|---|
| 2009/0160990 A1 | 6/2009 | Johnson |
| 2010/0110216 A1 | 5/2010 | Nishihara |
| 2010/0155576 A1 | 6/2010 | Merrill |
| 2014/0027619 A1* | 1/2014 | Ishii ........................ H04N 5/378 250/208.1 |
| 2016/0198108 A1* | 7/2016 | Guidash ................. H04N 5/374 348/308 |

* cited by examiner

EFFICIENT METHOD FOR READING AN IMAGING DEVICE USING CORRELATED DOUBLE SAMPLING

CROSS-REFERENCE TO RELATED APPLICATIONS

This application is a National Stage of International patent application PCT/EP2013/077861, filed on Dec. 20, 2013, which claims priority to foreign French patent application No. FR 1262662, filed on Dec. 21, 2012, the disclosures of which are incorporated by reference in their entirety.

FIELD OF THE INVENTION

The invention relates to a method for reading an imaging device intended for capturing images in a detector including a high number of photosensitive points called pixels generally organized into a matrix.

BACKGROUND

In a detector, a pixel represents the elementary sensitive element of the detector. Each pixel converts an electromagnetic radiation, or a flow of charges for a photoconductor, to which it is subjected into an electrical signal. The electrical signals derived from the different pixels are collected during a matrix-reading phase and are then digitized in such a way that they can be processed and stored to form an image. The pixels are often formed from a photosensitive area delivering a current of electric charges as a function of the flow of photons which they receive, and from an electronic circuit for processing this current. The photosensitive area generally includes a photosensitive element or photodetector which may, for example, be a photodiode, a photoresistor or a phototransistor. Large-dimension photosensitive matrices exist which may comprise several million pixels.

A radiation detector can be used for the imaging of ionizing radiation, and notably X or γ radiation, in the medical sector, for example for the detection of radiological images, or for non-destructive testing in the industrial sector. The photosensitive elements enable detection of visible or near-visible electromagnetic radiation. These elements are not sensitive or are barely sensitive to the radiation incident on the detector. A radiation converter known as a scintillator is then often used which converts the incident radiation, for example an X-radiation, or a radiation in a band of wavelengths to which the photosensitive elements present in the pixels are sensitive. An alternative consists in implementing the photosensitive element in a different material, referred to as a photoconductor, carrying out the direct conversion of the X-radiation into electric charges. This occurs, for example, in the case of matrices in which a first pixelized cadmium Telluride (CdTe) substrate is connected pixel-by-pixel to a CMOS read circuit which therefore no longer has the detection function.

It is known to implement an electronic processing circuit by means of a voltage follower enabling the reading of the charges accumulated in the photosensitive element, said charges forming a photosignal. A current source provides the power supply of the pixel during its reading.

In order to improve the quality of the useful image and reduce the level of noise in the useful image, a reading of each of the pixels of the matrix can be carried out by means of correlated double sampling (CDS), well known in the English-language literature. This method consists in performing two successive operations of reading the same pixel, the first, without the photosignal, immediately after a reset, the second, with the photosignal, with no reset between these two readings. A subtraction of the levels obtained in each of the read operations allows the level of noise linked to the pixel reset to be eliminated. The temporal proximity of the two read operations allows some temperature offsets of the detector to be eliminated.

A major disadvantage of the correlated double sampling reading is the prolongation of the detector reading time. In fact, it is necessary for a row of the matrix to perform the two read operations and also the reset operation before beginning the reading of the next row. Assuming that the read and reset operations each occupy the same time period, the complete correlated double sampling reading of the matrix requires three times more time than a simple reading without double sampling.

SUMMARY OF THE INVENTION

The invention aims to improve the correlated double sampling reading of the matrix by reducing the time required for the reading of all of the rows of the matrix.

For this purpose, the subject-matter of the invention is a method for reading an imaging device intended for capturing images and including a plurality of pixels organized into rows and columns forming a matrix, the pixels of the same column being linked to a column conductor enabling the successive reading of the photosignals acquired by the pixels of the column, the method consisting for each of the pixels in carrying out a correlated double sampling read phase, the read phase including an operation of resetting the pixel followed by two read operations, the first without the photosignal, and the second with the photosignal, characterized in that three steps are concatenated in succession for the pixels of the same column:
1. a first of the operations of reading the pixel of a first row,
2. one of the operations of reading a second row,
3. a second of the operations of reading the pixel of the first row.

By means of the invention, the time separating the two readings of the first row (step 2) is used to perform a read operation on the second row and possibly a different operation. For a 3T pixel, during step 2, the first row is reset. For a 4T pixel, during step 2, the charge transfer of the first row is carried out. This allows the duration of the complete reading of the matrix to be reduced while retaining the advantages of the correlated double sampling reading.

BRIEF DESCRIPTION OF THE DRAWINGS

The invention will be better understood and other advantages will become evident from a reading of the detailed description of one embodiment given by way of example, the description being illustrated by the attached drawing, in which.

DETAILED DESCRIPTION

For the sake of clarity, the same elements will be denoted by the same references in the different figures.

Figure 1:
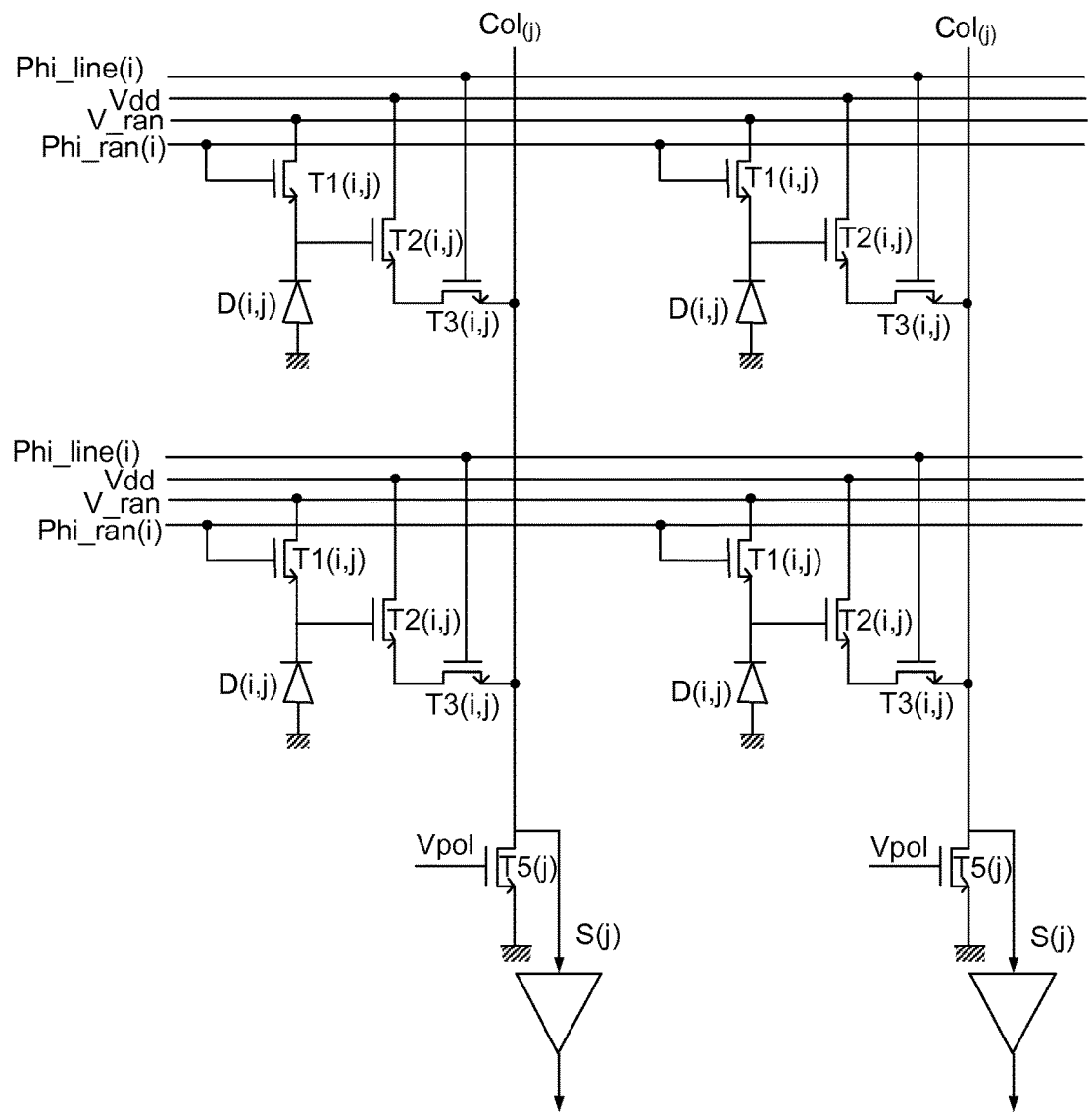
FIG. 1 shows an example of a matrix of pixels in which the invention can be implemented.

FIG. 1 shows schematically a matrix of two rows and two columns to simplify understanding. Four pixels are formed, each at the intersection of a row and a column. Obviously, real matrices are generally much larger and have a large number of rows and columns.

Each pixel includes a photosensitive zone shown here by a photodiode D and an electronic processing circuit formed from three transistors T1, T2 and T3. In FIG. 1, the references of the photodiode D and of the three transistors are followed by two coordinates (i,j) which can take the rank of the row for i and the rank of the column for j. In practice, this type of pixel may include other components, notably other transistors. This is why this pixel is also referred to as a 3T pixel, since it has at least three transistors, the function of each of which will be described below.

Generally speaking, it is known to implement matrices of pixels including transistors implementing additional crystalline silicon semiconductors known in the English-language literature by the abbreviation CMOS (Complementary Metal Oxide Semiconductor). The invention is not limited to this type of transistor, and may be implemented, for example, for matrices including thin-film transistors, known in the English-language literature as TFTs. TFTs may be metal-oxide-based, such as, for example, amorphous or crystalline indium gallium zinc oxide transistors, known in the English-language literature as IGZOs. Other families of TFTs can be implemented, such as, for example, organic TFTs, amorphous silicon TFTs, polycrystalline silicon TFTs, etc.

The pixels of the same column or more generally of the same rank share a transistor T5 and a read circuit S located at the column end. The transistor T5 and the read circuit S are linked to the pixels of the column by means of a conductor Col. The pixels of the same row are connected to four conductors carrying signals Phi_ligne, Vdd, V_ran and Phi_ran enabling the control of each of the rows of pixels.

The transistor T1 enables the re-initialization of the voltage of the cathode of the photodiode D, at the voltage V_ran, during a reset operation during which the control signal Phi_ran is active.

During an image capture phase, which takes place after a reset operation, the illumination received by the photodiode D causes the potential of its cathode to decrease. This image capture phase is followed by a read phase during which the potential of the photodiode D is read. To do this, the transistor T3 is turned on, thereby acting as a switch, due to the control Phi_ligne applied to its gate.

The transistor T2 operates as a follower, and the transistor T5 operates as a current source. The transistors T2 and T5 then form a voltage follower stage which copies the voltage present on the cathode of the photodiode D and reproduces it, to within an offset, on the input of the read circuit S at the column end. In order to carry out its copy, the transistor T2 requires a polarization current flowing in its drain and its source. This current is applied by a current generator formed by a transistor T5 common or otherwise to a plurality of pixels. In the example shown, the transistor T5 is common to a column of pixels.

The voltage Vs present at the input of the read circuit S may be expressed as follows:

$$Vs = Vp - V_T - K \qquad (1)$$

where Vp is the voltage of the cathode of the photodiode, $V_T$ is the threshold voltage of the transistor T2 and K is a constant linked, inter alia, to the value of the current delivered by the transistor T5.

The voltages V_ran and Vdd may be identical.

The addressing circuits, generally offset registers, generating the control signals Phi_ligne and Phi_ran are not shown in FIG. 1 and are disposed at the row end.

A main characteristic of the 3T pixel is that the charges accumulated on the cathode of the photodiode D are read immediately when T3 is turned on. No control other than that of the transistor T3 is necessary in order to read the photosignal.

The different outputs of the read circuits S of the different columns are then multiplexed by a stage not shown in the figure, in such a way as to obtain a video signal from a row or row portion.

It is also possible to use only a single current source transistor T5 for the entire matrix, provided that it is switched successfully onto the different columns, as these same columns are read.

The correlated double sampling reading consists in performing two operations for a given pixel, the first, without the photosignal, immediately after a reset operation, the second, with the photosignal, with no reset between these two readings. In the case of the matrix shown in FIG. 1 having 3T pixels, an image capture operation during which the photosignal appears at the cathode of the diode D takes place between the two read operations. All the pixels of the same row are read simultaneously. During a read operation, the transistor T3 is turned on by means of the signal Phi_ligne. During a reset operation, the transistor T1 is turned on by means of the signal Phi_ran.

Figure 2:
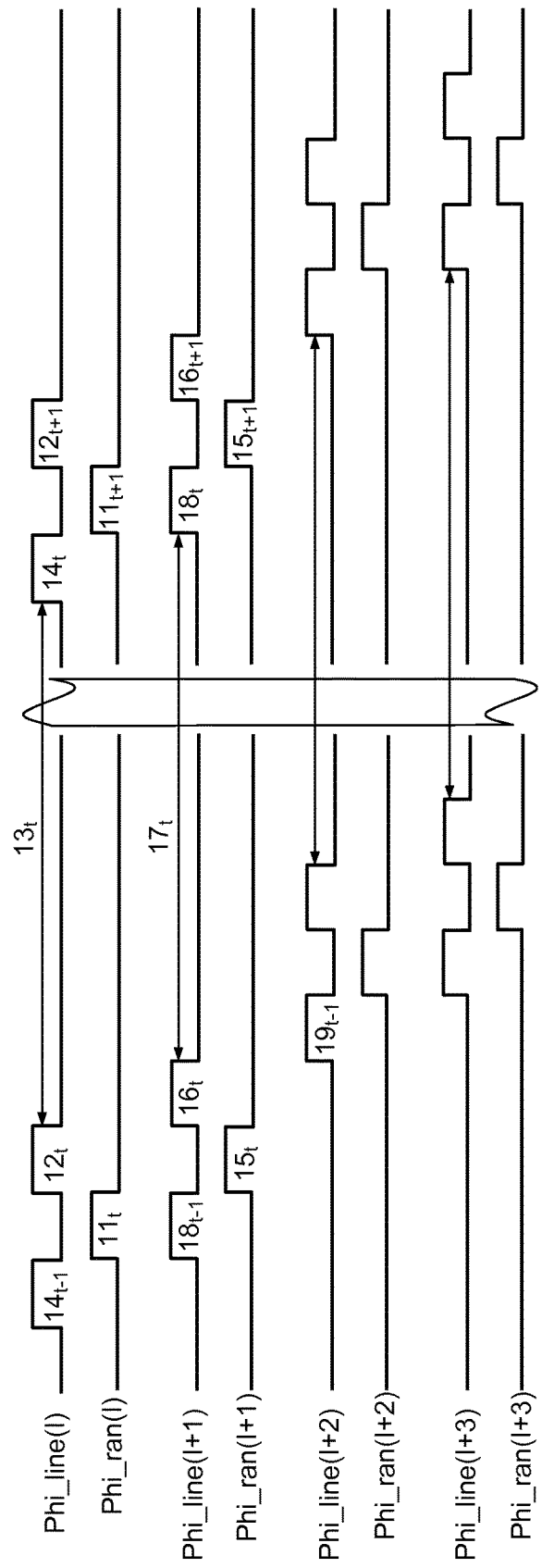
FIG. 2 shows, in the form of a timing chart, signals controlling the reading and resetting for four consecutive rows of the matrix shown in FIG. 1.

FIG. 2 shows, in the form of a timing chart, the read signal Phi_ligne and the reset signal Phi_ran for four consecutive rows I, I+1, I+2 and I+3 of the matrix shown in FIG. 1. The signals Phi_ligne and Phi_ran are logical signals that can assume two states. For convenience, a signal in a high logical state is shown when this signal turns on the corresponding transistor. This is merely a convention and the voltage values of the logical states depend on the type of transistor that is used.

For the row I, a reset operation $11_t$, a first read operation $12_t$, an image capture operation $13_t$ and a second read operation $14_t$ are concatenated for a frame t. After the read operation $14_t$, the reset operation $11_{t+1}$ and the first read operation $12_{t+1}$ are resumed for the following frame t+1. In FIG. 2, a read operation $14_{t+1}$, corresponding to the preceding frame t−1, also appears immediately before the reset operation $11_t$. For the row I+1, a reset operation $15_t$, a first read operation $16_t$, an image capture operation $17_t$ and a second read operation $18_t$ are concatenated. For the row I+1, on the one hand the read operation $18_{t-1}$ of the preceding frame t−1 and, on the other hand, the reset operation $15_{t+1}$ and the read operation $16_{t+1}$ of the following frame t+1 also occur. According to the invention, the read operation $14_{t-1}$ of the first row I, the read operation $18_{t-1}$ of the second row I+1 and the read operation $12_t$ of the first row I are concatenated in succession. The read operation $18_{t-1}$ and the reset operation $11_t$ are advantageously carried out simultaneously. Similarly, the read operation $12_t$ and the reset operation $15_t$ can be carried out simultaneously. In order to simplify the understanding of the invention, it is assumed that the durations of the read and reset operations are the same. In practice, one of the operations may require a longer duration of opening of the corresponding transistor. The longer operation takes precedence. Furthermore, for the same row, a short dead time between the read and reset operations can be provided in order to prevent the transistors T1 and T2 from conducting simultaneously, which would result in the reading of a voltage influenced by V_ran on the column conductor Col instead of purely the charges accumulated on the cathode of the photodiode D. For the rows I+2 and I+3, the same concatenation of the read and reset signals occurs as for the rows I and I+1 without any simultaneity of signals between the two pairs of rows. More precisely, for the row I+2, a second read signal $19_{t-1}$ of the frame t−1 occurs after the first read signal $16_t$ of the frame t. More generally, one operation of reading one row is interleaved between two operations of reading a different row. In other words, the operations of reading two different rows are interlaced. Furthermore, simultaneity of a reading and a reset for two different and, in the example shown, consecutive rows advantageously exists.

The control of the read and reset signals may be effected by means of a programmable logic circuit, such as, for example a field-programmable gate array, known in the English-language literature as an FPGA.

Figure 3:
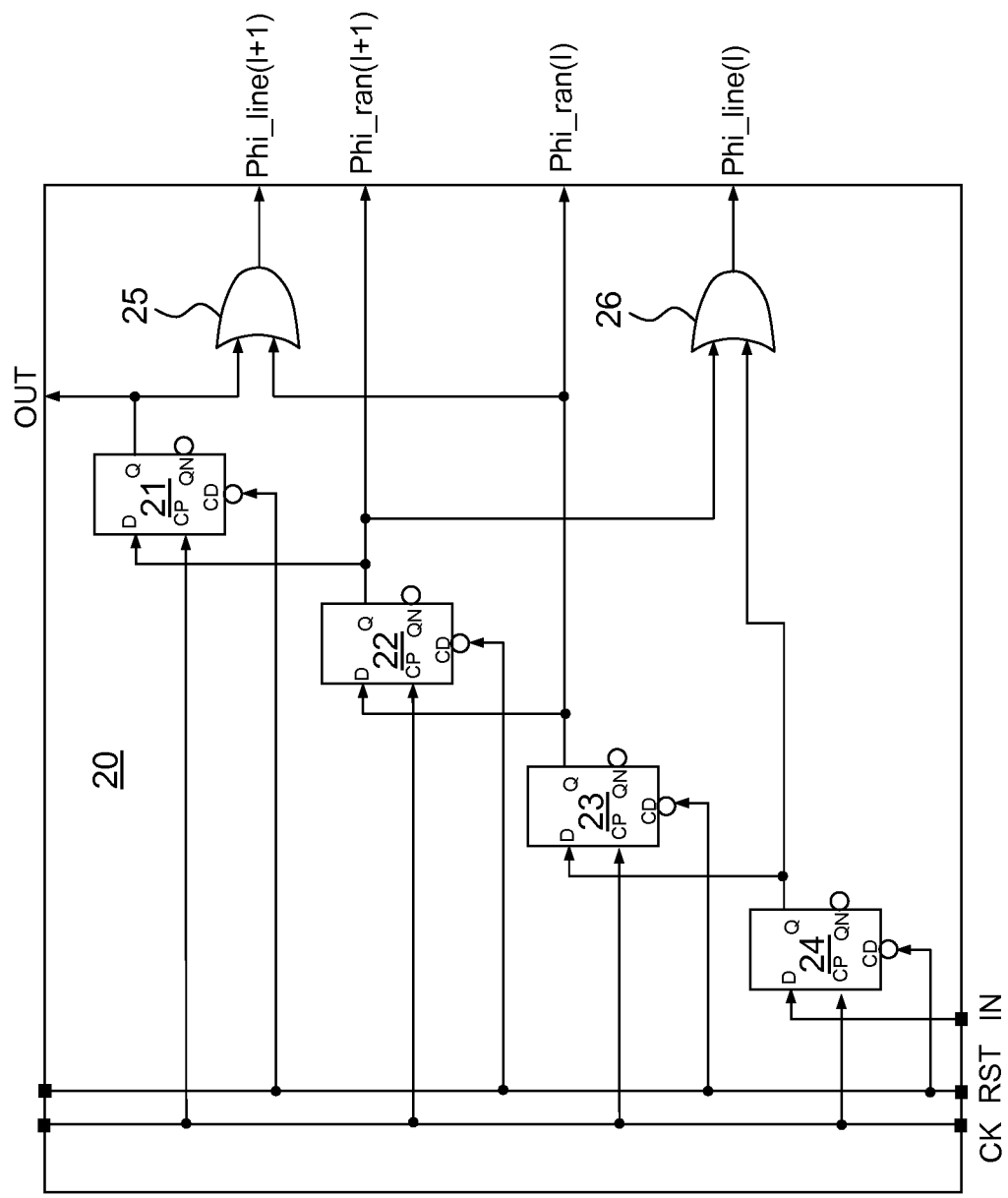
FIG. 3 shows an example of a circuit enabling the control of a matrix according to the timing chart shown in FIG. 2.

It is also possible to control these two signals by means of a specialized integrated circuit, well known in the English-language literature under the name of ASIC (Application-Specific Integrated Circuit). An example of such a specialized circuit 20 is shown in FIG. 3. In this example, this circuit enables control of the signals of two rows. It is obviously possible to implement a specialized circuit controlling a larger number of rows and/or other functions.

The circuit 20 includes four bistable circuits D 21, 22, 23 and 24 and two OR cells 25 and 26. The clock inputs CP of the four bistable circuits 21, 22, 23 and 24 receive an external clock signal CK and the reset inputs CD of the four bistable circuits 21, 22, 23 and 24 receive an external reset signal RST. The input D of the bistable circuit 24 receives an input signal IN from a different specialized circuit controlling the two rows I−2 and I−1. The output Q of the bistable circuit 24 is connected to the input D of the bistable circuit 23 and to a first input of the cell 26. The output Q of the bistable circuit 23 delivers the signal Phi_ran (I), is connected to the input D of the bistable circuit 22 and to a first input of the cell 25. The output Q of the bistable circuit 22 delivers the signal Phi_ran (I+1), is connected to the input D of the bistable circuit 21 and to the second input of the cell 26. The output Q of the bistable circuit 21 is connected to a second input of the cell 25 and delivers an output signal OUT intended to form the signal IN of the specialized circuit controlling the rows I+2 and I+3. The output of the cell 25 delivers the signal Phi_ligne (I+1) and the output of the cell 26 delivers the signal Phi_ligne (I).

FIGS. 2 and 3 describe the interlacing of read operations and a simultaneity of read and reset operations for two consecutive rows. In other words, the rows I, I+1, I+2 and I+3 are consecutive. This simplifies the control of the corresponding signals Phi_ligne and Phi_ran. Alternatively, it is possible to implement the interlacing and simultaneity for non-consecutive rows.

Figure 4:
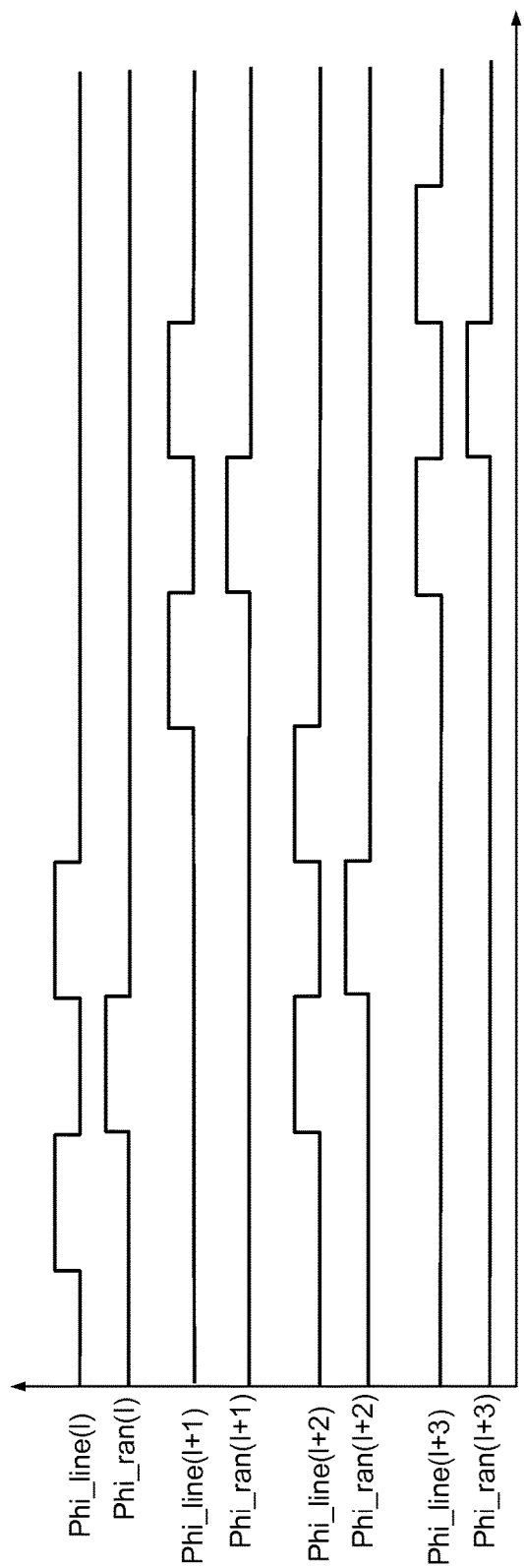
FIGS. 4 and 5 show alternative timing charts of control signals of the matrix shown in FIG. 1.

FIG. 4 describes the interlacing and simultaneity between two even rows I and I+2 and between two odd rows I+1 and I+3. To avoid overloading the figure, only a part of the timing chart is shown, without the image capture operations. In other words, a row is skipped in order to implement the interlacing and simultaneity. A greater skipping of rows is also possible. This alternative avoids the control of successive rows. This alternative prevents the control of one row from interfering with the adjacent row. More precisely, the reset of one row is prevented from interfering with the reading of an adjacent row.

Figure 5:
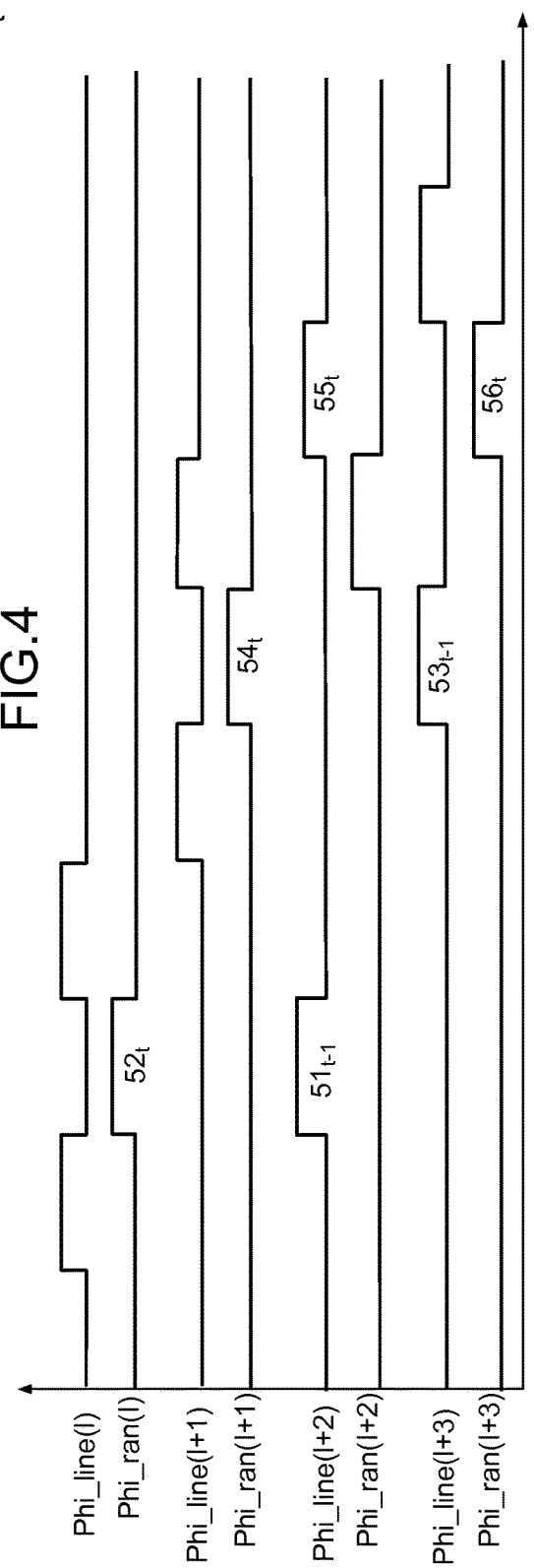

FIG. 5 describes a different alternative in which the interlacing and simultaneity are not symmetrical. In this alternative, for the row I+2, the second read operation $51_{t-1}$ of the frame t−1 is implemented simultaneously with the reset operation $52_t$ of the frame t for the row I. The first read operation $53_{t-1}$ of the frame t−1 for the row I+3 is implemented simultaneously with the reset operation $54_t$ of the frame t for the row I+1. The first read operation $55_t$ of the frame t for the row I+2 is implemented simultaneously with the reset operation $56_t$ of the frame t for the row I+3. The read operation $51_{t-1}$ of the row I+2 is interlaced between two read operations of the row I: the operation $57_{t-1}$ of the frame t−1 and the operation $58_t$ of the frame t. Similarly, the read operation $53_{t-1}$ of the row I+3 is interlaced between two read operations of the row I−1: the operation $59_{t-1}$ of the frame t−1 and the operation $60_t$ of the frame t.

Figure 6:
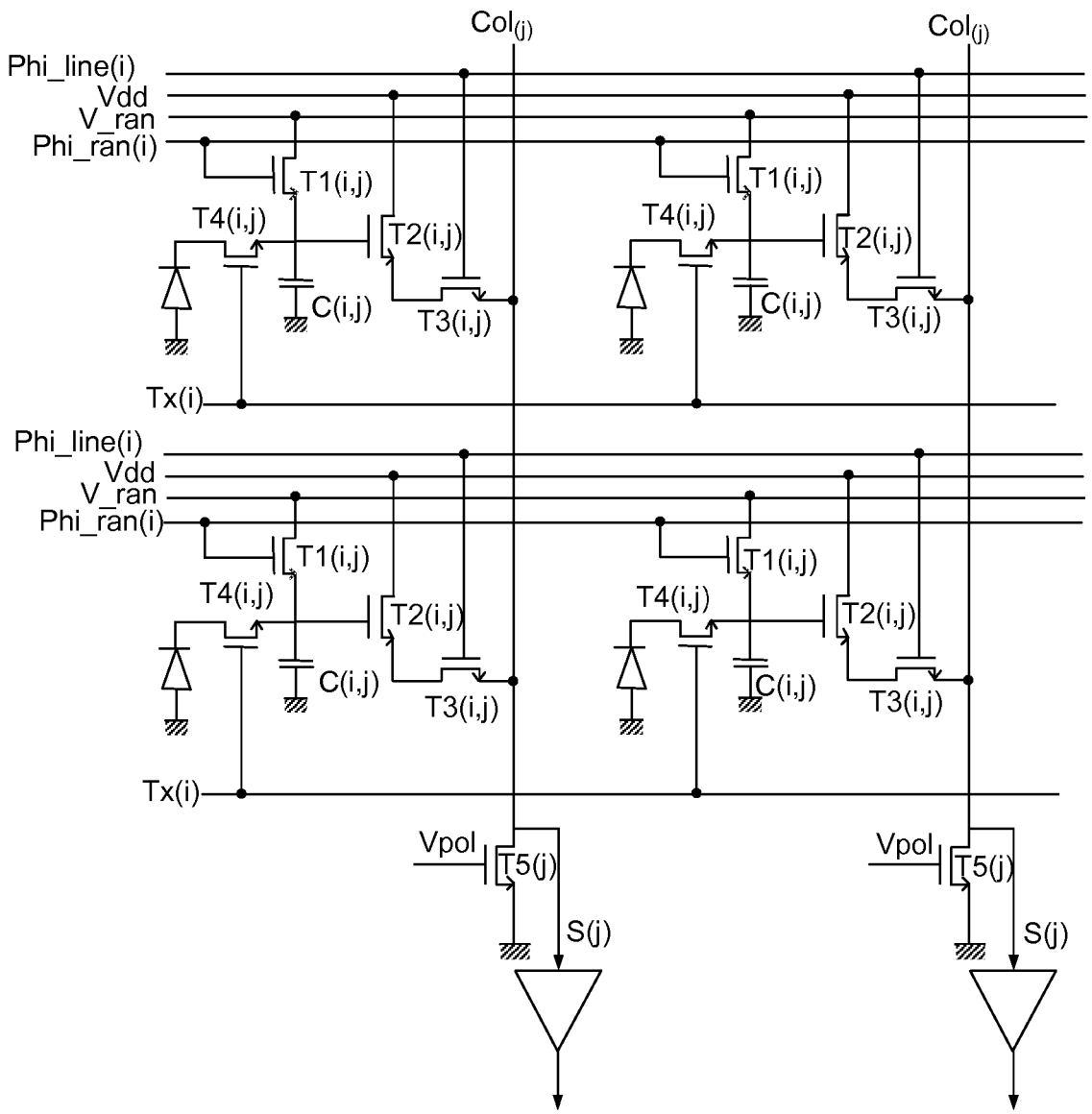
FIG. 6 shows another example of a matrix of pixels in which the invention can be implemented.

FIG. 6 shows schematically a different example of a matrix of two rows and two columns of 4T pixels. As previously, it is obvious that real matrices are generally much larger and have a large number of rows and columns. In addition to the photodiode D and the three transistors T1, T2 and T3 previously described with reference to FIG. 1, the 4T pixels include a fourth transistor T4 and a storage capacitance C. A reverse-biased PN junction is advantageously used to implement this capacitance. A capacitor can also be implemented. A "pinned diode" D, well known in the English-language literature, is generally used. The transistor T4 isolates the photodiode D and the storage capacitance C. The transistor T4 is controlled by a row transfer signal Tx dedicated to each row of the matrix. The matrices formed from 4T pixels are better adapted to the correlated double sampling. In fact, for the same frame, the two pixel-reading operations can be performed after the image capture operation. Between the two read operations, an operation is interleaved for transferring the charges from the diode D to the storage capacitance C. Before the first read operation, the pixel reset operation is performed by means of the transistor T1 controlled by the signal Phi_ran. This reset operation acts only on the storage capacitance C, and not on the diode D. Generally speaking, the 4T pixel designation collectively refers to pixels including the transistor T4 and allowing a charge transfer between a photodiode D and a storage capacitance C, regardless of the functions and additional transistors which this pixel may have. In a 4T pixel two controls are necessary in order to read a photosignal: a charge transfer control implemented by the transistor T4 and a row read command implemented by the transistor T3.

In a 4T pixel, it is possible to implement the two read operations by closing the transistor T3 continuously and implementing the charge transfer by means of the transistor T4 during the closure of the transistor T3. During this continuous reading, two samplings are carried out, the first before the charge transfer and the second after the charge transfer. This mode of operation has a disadvantage. More precisely, the period separating the two samplings must be sufficient to stabilize the charge transfer. This period represents a dead time that is unusable due to the closure of the transistor T3. By interrupting the reading of one row and by interleaving the reading of a different row during this dead time, the invention makes use of the dead time necessary for the charge transfer. This reduces the total duration for reading the entire matrix.

Figure 7:
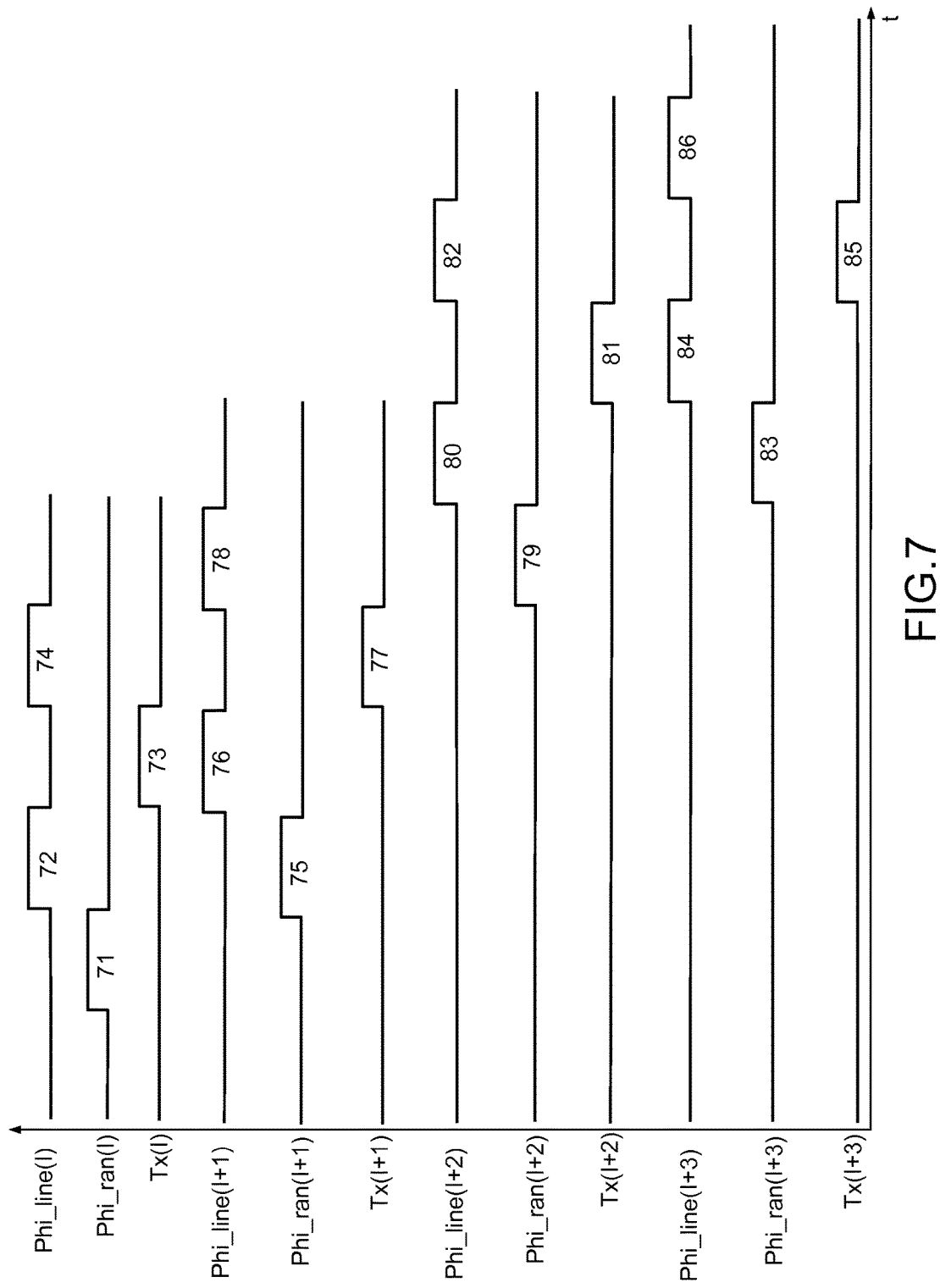
FIG. 7 shows, in the form of a timing chart, control signals of the matrix shown in FIG. 6.

FIG. 7 shows, in the form of a timing chart, control signals of four consecutive rows of the matrix shown in FIG. 6. The image capture operation does not appear in this figure since all of the commands occur after this operation. For the row I, a reset operation 71, a first read operation 72, a charge transfer operation 73 from the diode D to the storage capacitance C and a second read operation 74 are concatenated. For the row I+1, a reset operation 75, a first read operation 76, a charge transfer operation 77 from the diode D to the storage capacitance C and a second read operation 78 are concatenated. For the row I+2, a reset operation 79, a first read operation 80, a charge transfer operation 81 from the diode D to the storage capacitance C and a second read operation 82 are concatenated. For the row I+3, a reset operation 83, a first read operation 84, a charge transfer operation 85 from the diode D to the storage capacitance C and a second read operation 86 are concatenated. According to the invention, the read operation 72 of the first row I, the read operation 76 of the second row I+1 and the read operation 74 of the first row I are concatenated. Moreover, the charge transfer operation of the first row I and the first read operation of the second row I+1 are carried out simultaneously.

A read operation and a reset operation are advantageously carried out simultaneously on two different rows. More precisely, the read operation 72 of the row I and the reset operation 75 of the row I+1 are simultaneous. The read operation 78 of the row I+1 and the reset operation 79 of the row I+2 are simultaneous. The read operation 80 of the row I+2 and the reset operation 83 of the row I+3 are simultaneous.

A different simultaneity of read and charge transfer operations can advantageously be implemented: the second read operation 74 of the first row I and the charge transfer operation 77 of the second row I+1 can be carried out simultaneously. Similarly, the charge transfer operation 81 and the first read operation 84 can be carried out simultaneously. The second read operation 82 and the charge transfer operation 85 can be carried out simultaneously.

In the two embodiments implementing 3T or 4T pixels, the different rows for which a concatenation of read operations is carried out may or may not be consecutive.

The invention claimed is:

1. A method for reading an imaging device for capturing images and including a plurality of pixels organized into rows and columns forming a matrix, the pixels of a same column being linked to a column conductor enabling a successive reading of photosignals acquired by the pixels of the column, the method comprising, for each of the pixels:
    carrying out a correlated double sampling read phase, the read phase comprising an operation of resetting the pixel followed by two read operations, a first read operation being without the photosignal, and a second read operation being with the photosignal,
    wherein following three steps are concatenated in succession for the pixels of the same column:
    (1) a first of the operations of reading the pixel of a first row (I),
    (2) one of the operations of reading a second row (I+1), and
    (3) a second of the operations of reading the pixel of the first row (I) and
    wherein the pixels are 3T pixels and such that, for the first row (I), a reset operation, a first read operation, an image capture operation and a second read operation are concatenated for a current frame t, and a reset operation is concatenated for a frame (t+1) after the current frame (t), such that, for a second row (I+1), a second read operation is concatenated for a frame (t−1) before the current frame (t), a reset operation, a first read operation, an image capture operation and a second read operation are concatenated for the current frame (t), and such that the second read operation of the second row (I+1) for the preceding frame (t−1) carried out in step (2) and the reset operation of the first row (I) for the current frame (t) are carried out simultaneously.

2. The method as claimed in claim 1, wherein an operation of reading the pixel of the first row (I) is carried out simultaneously with an operation of resetting the pixel of the second row (I+1).

3. The method as claimed in claim 2, wherein the first read operation of the first row (I) for the current frame (t) and the reset operation of the second row (I+1) for the current frame (t) are carried out simultaneously.

4. A method for reading an imaging device for capturing images and including a plurality of pixels organized into rows and columns forming a matrix, the pixels of a same column being linked to a column conductor enabling a successive reading of photosignals acquired by the pixels of the column, the method consisting comprising, for each of the pixels:
    carrying out a correlated double sampling read phase, the read phase comprising an operation of resetting the pixel followed by two read operations, a first read operation being without the photosignal, and a second read operation being with the photosignal,
    wherein following three steps are concatenated in succession for the pixels of the same column:
    (1) a first of the operations of reading the pixel of a first row (I),
    (2) one of the operations of reading a second row (I+1), and
    (3) a second of the operations of reading the pixel of the first row (I),
    wherein an operation of reading the pixel of the first row (I) is carried out simultaneously with an operation of resetting the pixel of the second row (I+1), and
    wherein the pixels are 4T pixels, and in that, for the pixels of the same column, a charge transfer operation of the first row (I) and the first read operation of the second row (I+1) carried out in step (2) are carried out simultaneously.

5. The method as claimed in claim 4, wherein the operation of reading the pixel of a first row (I) carried out in step (3) is carried out simultaneously with an operation of transferring the charge of the pixel of a second row (I+1).

6. The method as claimed in claim 4, wherein, for a first row (I), a reset operation, a first read operation, a charge transfer operation and a second read operation are concatenated, such that, for a second row (I+1), a reset operation, a first read operation, a charge transfer operation and a second read operation are concatenated, such that, for a third row (I+2), a reset operation, a first read operation, a charge transfer operation and a second read operation are concatenated, and such that the first read operation of the first row (I) carried out in step (1) and the reset operation of the second row (I+1) are carried out simultaneously.

7. The method as claimed in claim 6, wherein the read operation of the second row (I+1) and the reset operation of the third row (I+2) are carried out simultaneously.

8. The method as claimed in claim 1, wherein the first (I) and second (I+1) rows are consecutive.

9. The method as claimed in claim 1, wherein the first (I) and second (I+2) rows are not consecutive.

10. The method as claimed in claim 4, wherein the first (I) and second (I+1) rows are consecutive.

11. The method as claimed in claim 4, wherein the first (I) and second (I+2) rows are not consecutive.

12. A method for reading an imaging device for capturing images and including a plurality of pixels organized into rows and columns forming a matrix, the pixels of a same column being linked to a column conductor enabling a successive reading of photosignals acquired by the pixels of the column, the method consisting comprising, for each of the pixels:

carrying out a correlated double sampling read phase, the read phase comprising an operation of resetting the pixel followed by two read operations, a first read operation being without the photosignal, and a second read operation being with the photosignal, wherein following three steps are concatenated in succession for the pixels of the same column:

(1) a first of the operations of reading the pixel of a first row (I), (2) one of the operations of reading a second row (I+1), and (3) a second of the operations of reading the pixel of the first row (I), wherein the pixels are 4T pixels, and in that, for the pixels of the same column, a charge transfer operation of the first row (I) and the first read operation of the second row (I+1) carried out in step (2) are carried out simultaneously.

13. The method as claimed in claim 12, wherein the first (I) and second (I+1) rows are consecutive.

14. The method as claimed in claim 12, wherein the first (I) and second (I+2) rows are not consecutive.

* * * * *